US00RE43679E

(19) United States
(12) Reissued Patent
Van Essen et al.

(10) Patent Number: US RE43,679 E
(45) Date of Reissued Patent: Sep. 25, 2012

(54) ADJUSTABLE ACTIVITY DRAINAGE BOX

(75) Inventors: Roy Van Essen, North Gower (CA); Mark Landry, Chicopee, MA (US); Richard Pitt, Ontario (CA)

(73) Assignee: AstenJohnson, Inc., Charleston, SC (US)

(21) Appl. No.: 13/184,689

(22) Filed: Jul. 18, 2011

Related U.S. Patent Documents

Reissue of:
(64) Patent No.: 6,780,286
Issued: Aug. 24, 2004
Appl. No.: 10/201,457
Filed: Jul. 22, 2002

U.S. Applications:
(63) Continuation-in-part of application No. 09/688,194, filed on Oct. 16, 2000, now abandoned.

(51) Int. Cl.
*D21F 1/18* (2006.01)

(52) U.S. Cl. ..... 162/352; 162/354; 162/355; 162/356

(58) Field of Classification Search ..... 162/351, 162/352
See application file for complete search history.

(56) References Cited

U.S. PATENT DOCUMENTS

| | | | | | |
|---|---|---|---|---|---|
| 2,928,465 | A | * | 3/1960 | Wrist | 162/352 |
| 3,027,940 | A | * | 4/1962 | Dunlap | 162/352 |
| 3,864,207 | A | * | 2/1975 | Ekberg | 162/365 |
| 3,874,998 | A | * | 4/1975 | Johnson | 162/308 |
| 4,140,573 | A | * | 2/1979 | Johnson | 162/209 |
| 4,321,108 | A | * | 3/1982 | Goddard et al. | 162/272 |
| 4,443,298 | A | * | 4/1984 | Thorp | 162/252 |
| 4,559,105 | A | * | 12/1985 | Sennett et al. | 162/352 |
| 4,684,441 | A | * | 8/1987 | Ibrahim | 162/198 |
| 4,718,983 | A | * | 1/1988 | Ibrahim | 162/252 |
| 4,865,692 | A | | 9/1989 | Kade et al. | |
| 5,011,577 | A | * | 4/1991 | Hansen et al. | 162/352 |

(Continued)

FOREIGN PATENT DOCUMENTS

GB 2 190 932 12/1987

(Continued)

OTHER PUBLICATIONS

Smook, Handbook for Pulp and Paper Technologists, 1992, Angus Wilde Publications, 2nd edition, chapter 16.*

*Primary Examiner* — Anthony Calandra
(74) *Attorney, Agent, or Firm* — Volpe and Koenig, P.C.

(57) ABSTRACT

A process, and an apparatus, for improving sheet properties in the initial impingement zone of a paper making machine including a forming section, a forming fabric moving in the machine direction and a head box having a head box slice which delivers a stock jet onto the moving forming fabric. The scale and intensity of agitation within the stock is adjusted by adjusting some of the support elements beneath the forming fabric adjacent the head box slice so that they either contact, or do not contact, the machine side surface of the forming fabric and observing the effect, if any, that the adjustment has on the quality of the sheet product being made on the paper making machine. This technique is of use in a papermaking machine forming section having a single open surface forming fabric, in the initial open surface section of a so-called hybrid gap former having two superposed forming fabrics, and in the forming section of a two fabric papermaking machine.

13 Claims, 4 Drawing Sheets

U.S. PATENT DOCUMENTS

| | | | | | |
|---|---|---|---|---|---|
| 5,061,347 | A | * | 10/1991 | Bubik et al. | 162/301 |
| 5,080,760 | A | * | 1/1992 | Smith et al. | 162/351 |
| 5,089,090 | A | * | 2/1992 | Hansen | 162/351 |
| 5,221,438 | A | * | 6/1993 | Takeuchi | 162/352 |
| 5,262,010 | A | * | 11/1993 | Bubik et al. | 162/352 |
| 5,320,713 | A | * | 6/1994 | Bubik et al. | 162/203 |
| 5,387,320 | A | * | 2/1995 | Jaakkola | 162/301 |
| 5,389,206 | A | * | 2/1995 | Buck et al. | 162/301 |
| 5,421,961 | A | * | 6/1995 | Miller | 162/252 |
| 5,437,769 | A | * | 8/1995 | Bando et al. | 162/301 |
| 5,456,803 | A | * | 10/1995 | Tokuno | 162/304 |
| 5,660,689 | A | * | 8/1997 | Bartelmuss et al. | 162/352 |
| 5,695,613 | A | * | 12/1997 | Hentila et al. | 162/301 |
| 5,698,613 | A | * | 12/1997 | Jhaveri | 523/139 |
| 5,871,617 | A | * | 2/1999 | Iwata et al. | 162/301 |
| 5,914,009 | A | * | 6/1999 | Kotitschke | 162/301 |
| 6,106,672 | A | * | 8/2000 | Dodds | 162/312 |
| 6,126,786 | A | * | 10/2000 | White et al. | 162/209 |

FOREIGN PATENT DOCUMENTS

| | | | | |
|---|---|---|---|---|
| GB | 2190932 | A | * | 12/1987 |
| JP | 413699 | | | 2/1992 |
| JP | 6322692 | | | 11/1994 |
| JP | 11350372 | | | 12/1999 |
| WO | WO 99/66121 | | | 12/1999 |
| WO | WO 9966121 | A1 | * | 12/1999 |

* cited by examiner 1
2
2A
2B
3
4
5
6
7
8
8A
9
10
11
12
14
14A
15
16
17
20

1
2
2A
2B
3
4
5
6
7
9
10
11
12
14
15
16
17

ADJUSTABLE ACTIVITY DRAINAGE BOX

Matter enclosed in heavy brackets [ ] appears in the original patent but forms no part of this reissue specification; matter printed in italics indicates the additions made by reissue.

This application is a continuation-in-part of U.S. application Ser. No. 09/688,194 filed Oct. 16, 2000 (now abandoned).

SUMMARY OF THE INVENTION

The present invention relates to a process, and an apparatus for improving sheet properties in the forming section of a paper making machine, which section includes a forming fabric moving in the machine direction and a head box having a head box slice which delivers a stock jet onto the moving forming fabric. It is particularly concerned with a process and an apparatus in which the scale and intensity of the activity within the stock is adjusted by altering the position of some of the fabric support elements beneath the forming fabric adjacent the head box slice, so that they either contact, or do not contact, the machine side surface of the forming fabric and observing the effect, if any, that the adjustment of the position of the selected support element or elements has on the quality of the paper product being made on the paper making machine. These fabric support elements are located on at least one drainage box. This invention is thus of use in both a conventional papermaking machine forming, section having a single open surface forming fabric, in the initial open surface section of a so-called hybrid gap former having two superposed forming fabrics, and in twin fabric papermaking machines equipped with a curved forming shoe.

BACKGROUND OF THE INVENTION

In the manufacture of paper and board products, a highly aqueous stock consisting of about 98-99.8% water and from 0.2-2% papermaking fibers and other solids is ejected at high speed from a headbox slice onto a moving forming fabric. Adjacent the head box slice, the forming fabric passes in sliding contact over a plurality of static fabric support elements which serve to support the forming fabric, and to define a reference surface over which the forming fabric moves. Depending on the surface profile chosen for the fabric support elements, they may also assist in draining water from and generating turbulence in the stock on the forming fabric. The fabric support surfaces usually include a lead blade located more or less underneath the point at which the stock jet impinges the forming fabric, followed downstream by at least two additional surfaces, each of which may be flat, or profiled to act as foils (e.g. as disclosed by Wrist in U.S. Pat. No. 2,928,465) or as agitators (e.g. as disclosed by Johnson, in U.S. Pat. No. 3,874,998), although stock agitation is not typically initiated at this very early point in a forming section. In current practice, the individual fabric contacting elements adjacent the head box slice are not vertically adjustable after installation (see for example Rulis et al., U.S. Pat. No. 6,274,002). These elements are normally mounted onto the supporting structure using either a dovetail, or a T-bar, and in some cases are solidly mounted. The mountings are also arranged on the supporting structure so that all of the elements are in permanent non-adjustable contact with the forming fabric. Stock activity can only be adjusted by changing, or physically removing, the fabric contact elements by sliding them out of their dovetail or T-bar mount. It is both very difficult and time consuming to carry out such a change in the configuration of the forming section fabric supporting elements while the paper making machine is running, bearing in mind that the forming fabric can be moving at up to 100 kph.

Good sheet properties result from the injection of kinetic energy into the stock, which causes the papermaking fibers to become agitated and thus relatively more uniformly dispersed. This is particularly important in the early part of the forming section adjacent the head box slice, where the paper making fibers are still relatively mobile.

Paper makers are currently seeking means to accommodate changes in the basis weight of the paper product being manufactured by the same machine. For example, a papermaking machine producing liner or board grades at a relatively low basis weight may have to shift to a far higher basis weight product which requires a much slower machine speed. This change in speed reduces the beneficial stock turbulence and adversely affects product quality. It is thus apparent that a given papermaking machine, without some means of adjustment, is best at making one grade of paper product and cannot readily be altered to make a significantly different one. It is not uncommon today for a papermaking machine to have to accommodate a doubling or tripling of the basis weight of the product being manufactured. Such changes are frequently difficult to manage without compromising sheet quality, and therefore alternative means of achieving a required level of activity in the stock are necessary to accommodate changes in paper grade with minimal disruption to production.

This invention seeks to provide a method and an apparatus by means of which the paper maker can alter the number of fabric support elements in contact with the forming fabric in the area immediately after the stock impinges onto the forming fabric adjacent to the head box slice so as either to enhance, to maintain or to diminish stock activity and thereby optimize agitation in accordance with papermaking conditions to provide a product of acceptable quality. It also offers the possibility that a contact element with a given profile can be vertically adjusted to be out of contact with the forming fabric and a support element with a different profile vertically adjusted to be in contact with the forming fabric. It further offers the opportunity to change the support element so that one element profile can be changed for another while the element is not in contact with the forming fabric. Since the effect, if any, of adjusting a particular support element can only be determined after the paper making conditions have stabilized and product made under the new conditions retrieved from the paper making machine and examined, there inevitably is a time lag between a support element being adjusted and the consequences of that adjustment being known. This time lag generally will be at least several minutes, but can be up to an hour.

DISCUSSION OF THE PRIOR ART

Smith et al. in U.S. Pat. No. 5,080,760 disclose a sealed pressurized forming board in which the rate of drainage of fluid from the stock is slowed by applying a small positive pressure to the machine side of the forming fabric, which also allows stock activity to be initiated without increasing drainage. The level of stock activity can only be controlled by physically removing the fabric supporting elements and replacing them with others having differing support surface profiles.

Johnson in U.S. Pat. No. 4,140,573 discloses a sealed cover for a low vacuum suction box in which all of the fabric contacting elements shown have an essentially flat surface in contact with the fabric and some of the fabric contacting elements are fixed in a position that is a small amount below the others. This unit requires an applied vacuum which is sufficient to cause the forming fabric to contact all of the element surfaces so that the forming fabric follows an undulating path, thereby inducing agitation in the stock. Johnson discloses that the distance below the normal plane of the fabric of some of the elements can be adjusted by means of pins and set screws, or by movement of an element having a sloping T-recess relative to sloping a T-bar. This box is not generally used adjacent the headbox slice, since vacuum assisted drainage is usually not desirable at that early point in the forming section.

Miller in U.S. Pat. No. 5,421,961 discloses a forming board whose cross-machine direction orientation relative to the headbox is adjustable and controlled so as to maintain it in parallel relation to the slice. There is no effort or intention to control stock activity.

Thorp in U.S. Pat. No. 4,443,298 discloses an adjustable blade support member whereby, in one embodiment, the blade-to-blade spacing in the machine direction is adjusted by means of a screw. However, the elements are only moved laterally, not vertically.

Ibrahim in U.S. Pat. No. 4,684,441 and U.S. Pat. No. 4,718,983 discloses a forming board in which the width of the lead-in blade is adjustable without stopping the papermaking machine. A thin strip located on the paper side surface of the blade can be moved so as to intercept the point of impingement of the stock jet.

Morley in GB 2,190,932 discloses a forming board in which the depth of a slot or groove can be changed by physically removing or inserting spacers of different thicknesses, without stopping the papermaking machine so as to induce microturbulence.

Goddard in U.S. Pat. No. 4,321,108 describes a forming section in which the fabric supporting structures are carried by supporting rails extending along the length of the forming section and spaced across its width. The fabric supporting structures are attached to the rails by a clamping means such as a C-clamp or a J-clamp. Since adjustment of the spacing of the fabric supporting structures in the machine direction requires access to the clamping means, the machine has to be stopped to make any adjustments.

Tokuno, in U.S. Pat. No. 5,456,803 describes a twin fabric forming section in which at least one side of the forming fabric is contacted by table rolls so arranged as to deflect the fabrics as they pass over them. By causing the forming fabrics to move in an undulating path pressure pulses are generated in the stock which apply shear forces to the paper web to dewater it. A disadvantage with this forming section appears to be the use of multiple table rolls; these are known to cause significant problems in modern fast papermaking machines.

Rulis, in U.S. Pat. No. 6,274,002 describes a paper making machine in which several support elements in the paper making machine forming section can be moved by means of a mechanical pin-and-slot mechanism either vertically, or to alter the orientation of the contact surface of the element relative to the machine side surface of the forming fabric. The positions of one, or more, support elements are changed in response to variations in preselected paper making condition parameters which are provided by suitably located sensors. Rulis is typical of many proposed systems in that a mechanical drive system located beneath the forming fabric is used to alter the position of the selected support element. Experience shows that as these drive devices are exposed to the white water draining through the forming fabric their long term reliability is very questionable, due to a coating of paper making solids which forms rapidly on them.

Ekberg, in U.S. Pat. No. 3,864,207 describes a forming section in which at least one of the fabric supporting devices is flexibly supported, for example by means of an elastomeric block. By flexing the support, a fabric contacting surface is caused to move rapidly and continuously through a more or less elliptical path. In the upper part of the path the surface is in contact with the forming fabric and urges it in the machine direction. In the lower part of the path the surface is not in contact with the forming fabric and moves in the opposite direction. The device moves through the support element through this elliptical path quite rapidly, at a rate of from about 1,000 to about 4,000 strokes/minute. It is thus apparent that the fabric supporting surface is only in contact with the forming fabric for part of the more or less elliptical path. The device is alleged to reduce the power requirements to move the forming fabric in the machine direction, and to promote agitation within the stock on the forming fabric.

A number of inventors have disclosed vertically adjustable support element mounting devices. Typical structures are shown by: Bartelmuss et al in U.S. Pat. No. 5,660,689; Bubik et al. in U.S. Pat. No. 5,262,010 and U.S. Pat. No. 5,061,347; and Jaakkola U.S. Pat. No. 5,387,320.

SUMMARY OF THE INVENTION

This invention seeks to provide both a process, and an apparatus, whereby agitation in the stock on the forming fabric adjacent to the head box slice can be readily altered by the paper maker, thus providing some level of quality control over the formation in the product being made, without having to stop the paper making machine for adjustments to be carried out. It is thus possible to initiate agitation within the stock, and to adjust both its scale and intensity, adjacent to the headbox slice. This is achieved by mounting at least some of the fabric support elements on vertically adjustable support means so that their height can be altered so as to contact, or not to contact, the machine side of the forming fabric. Further, the apparatus envisaged by this invention allows the element vertical position to be adjusted so that the element is either moved into contact, or moved out of contact, with the forming fabric without stopping the paper making machine.

Thus in a first broad embodiment this invention seeks to provide a process for improving sheet properties in a paper making machine including a forming section, at least one forming fabric, having a machine side and a paper side, moving in the machine direction and a head box having a head box slice which delivers a stock jet onto the paper side of the at least one moving forming fabric, comprising the steps of:

(i) discharging the stock jet onto the paper side of the at least one moving forming fabric;

(ii) causing the machine side of the at least one forming fabric carrying the stock on its paper side to move over in sequence in the machine direction:

a first fixed support element adjacent the head box slice and in contact with the forming fabric;

at least one drainage box provided with a foraminous support surface, which support surface includes at least one vertically adjustable support element, and provided with support means for the first fixed element; and a last fixed support element in contact with the forming fabric, which together with the first fixed support element and the machine side of the at least one forming fabric defines a reference surface; and (iii) adjusting both the scale and intensity of agitation in the stock at at least one locus by adjusting the vertical position relative to the reference surface of at least one vertically adjustable element whereby the at least one element is adjusted vertically into a position chosen from the group consisting of in contact with the machine side of the forming fabric, and out of contact with the machine side of the forming fabric, and (iv) continuing to operate the forming section according to steps (i) and (ii).

Preferably, the process further includes:

(v) after a lapse of time sufficient for stable conditions to be re-established in the forming section following step (iii);

(vi) assessing the sheet properties; and (vii) if required repeating step (iii) to improve sheet properties further.

Preferably in step (iii) a first element is adjusted to be out of contact with the forming fabric and a second element is adjusted to be in contact with the forming fabric.

Alternatively, in step (iii) a first element is adjusted to be out of contact with the forming fabric and a second element is adjusted to be in contact with the forming fabric, and the two elements have the same fabric contacting surface profile.

Alternatively, in step (iii) a first element is adjusted to be out of contact with the forming fabric and a second element is adjusted to be in contact with the forming fabric, and the two elements do not have the same fabric contacting surface profile.

In a second broad embodiment this invention seeks to provide an apparatus for improving sheet properties in a paper making machine including a forming section, at least one forming fabric, having a machine side and a paper side, moving in the machine direction and a head box having a head box slice which delivers a stock jet onto the paper side of the at least one moving forming fabric, comprising in sequence in the machine direction:

a first fixed support element adjacent the head box slice and in contact with the machine side of the at least one forming fabric;

at least one drainage box provided with a foraminous support surface, which support surface includes at least one vertically adjustable support element, and provided with support means for the first fixed element;

a last fixed support element in contact with the machine side of the at least one forming fabric, which together with the first fixed support element and the machine side of the at least one forming fabric defines a reference surface; and an independently controlled vertical adjustment means for the at least one vertically adjustable support element which permits adjustment of the vertically adjustable element while the paper making machine is operating.

Preferably, the last fixed element is supported by an adjacent drainage box in the forming section. Alternatively, the last fixed element is supported by the at least one drainage box.

Preferably, the apparatus includes one drainage box. Alternatively, the apparatus includes two drainage boxes, each of which supports part of the foraminous surface.

Preferably, the foraminous surface includes a plurality of support elements, at least one of which is vertically adjustable, and the remainder of which have their fabric support surfaces located along the reference surface. More preferably, the foraminous surface includes a plurality of support elements, at least some of which are vertically adjustable while the paper making machine is operating, and the remainder of which have their fabric support surfaces located along the reference surface. Alternatively, the foraminous surface includes a plurality of support elements, all of which are vertically adjustable independently of the others while the paper making machine is operating. Conveniently, the foraminous surface includes either a plurality of support elements in which alternate elements are vertically adjustable, or a plurality of support elements in which alternate elements are vertically adjustable, and in which the support elements adjacent the first and last fixed elements are adjustable.

Preferably, in the forming section the profile of the supporting surfaces of the elements are all the same.

Alternatively, in the forming section the profile of the supporting surfaces of the elements are not all the same.

Alternatively, in the forming section the profile of the supporting surfaces of the vertically adjustable elements are all the same.

Alternatively, in the forming section the profile of the supporting surfaces of the vertically adjustable elements are not all the same.

Preferably, at least that portion of the forming section adjacent the head box slice has an open surface. More preferably, the papermaking machine including the forming section is chosen from the group consisting of:

an open surface papermaking machine having a single forming fabric;

a hybrid gap former papermaking machine having two superposed forming fabrics in which at least that portion of the forming section adjacent the head box slice has one forming fabric having an open surface; and a twin fabric papermaking machine having two forming fabrics each having a paper side and a machine side, in which the jet of stock is delivered into the gap between the paper sides of the two fabrics, and including at least one drainage box in which at least one support element in contact with the machine side of one of the forming fabrics is moveable.

In the context of the direction of adjustment of the adjustable forming fabric support elements used in this invention, the word "vertical" is to be taken to mean a direction essentially perpendicular to the machine side of the forming fabric adjacent to that element. In an open surface forming section, either as part of a single forming fabric machine or as the initial part of a hybrid gap former, this generally will be in a truly vertical direction, as the forming fabric open surface is horizontal. In the forming section of a twin fabric papermaking machine, this will often be a direction other than truly vertical, since the forming sections in such machines are often not horizontal.

DETAILED DESCRIPTION OF THE INVENTION

The invention will now be described with reference to the attached schematic drawings in which.

Figure 1:
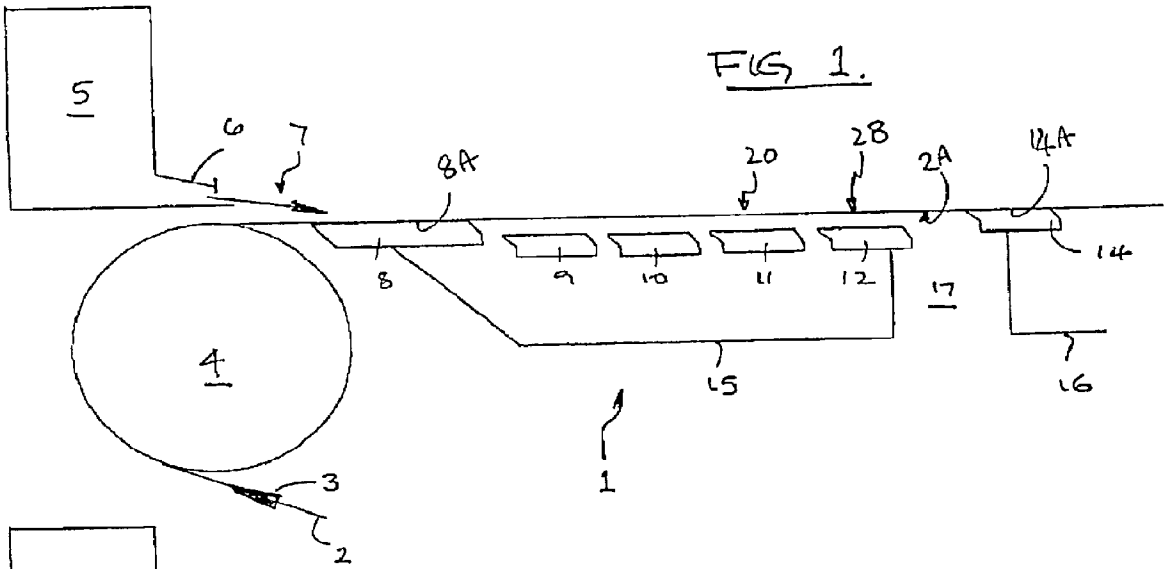
FIG. 1 shows schematically the general arrangement of the initial impingement zone of a paper making machine having an open surface forming section.

Referring first to FIG. 1, the initial impingement zone 1 shown includes a forming fabric 2 which moves in the machine direction indicated at 3. The forming fabric 2 wraps around a breast roll 4, and passes underneath a head box 5, which has a head box slice 6. A jet of stock 7 is delivered from the head box slice 6 onto the paper side 2B of the moving forming fabric 2 as its machine side 2A passes over support elements 8, 9, 10, 11, 12, and 14. Support elements 8-12 inclusive are mounted onto a first drainage box 15, and support element 14 is mounted onto a second drainage box 16. The drainage box is not sealed, and drainage through the forming fabric is consequently not vacuum assisted. There is a gap 17 between the two drainage boxes 15 and 16.

As shown in FIG. 1, the machine side surface 2A of the forming fabric 2 is in the reference surface 20. This plane is defined by the location of the fabric supporting surface 8A on the first fixed support element, and by the location of the fabric supporting surface 14A on the last fixed support element 14. The position of the reference surface can be readily determined, as its ends are defined by two fixed support surfaces. It is therefore used in this invention as a datum line for adjusting the vertical position of the adjustable support elements relative to the forming fabric.

In between the first fixed support element 8, and the last fixed support element 14, the foraminous surface includes four support elements 9-12. As shown in FIG. 1, all four are adjusted so that they are retracted out of the reference plane 20 (in FIG. 1, and the other Figures, all vertical distances concerning the adjustable support elements are exaggerated for clarity) and thus out of contact with the forming fabric. Several arrangements for these support elements are possible.

Figure 2:
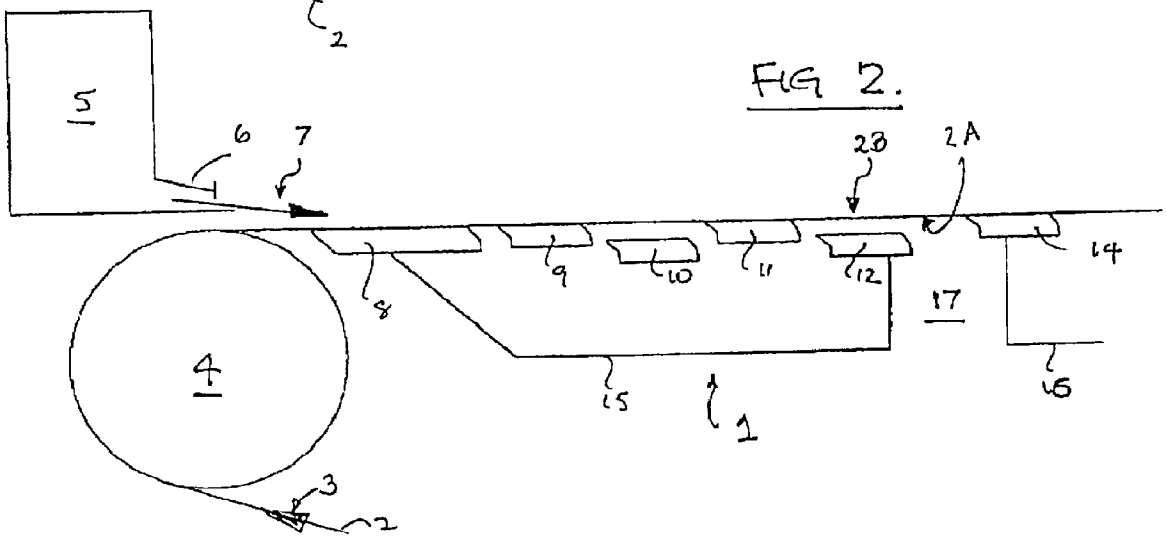
FIG. 2 shows the apparatus of FIG. 1 set up for use.

FIG. 2 shows one possibility. In this arrangement, support elements 10 and 12 are adjusted to be out of contact with the forming fabric, and support elements 9 and 11 are adjusted to be in contact with the forming fabric. Depending upon the level of activity desired in the stock at this early point in the formation process, it may be desirable to reverse this sequence, and adjust elements 9 and 11 to be out of contact, and elements 10 and 12 to be in contact with the forming fabric.

Figure 3:
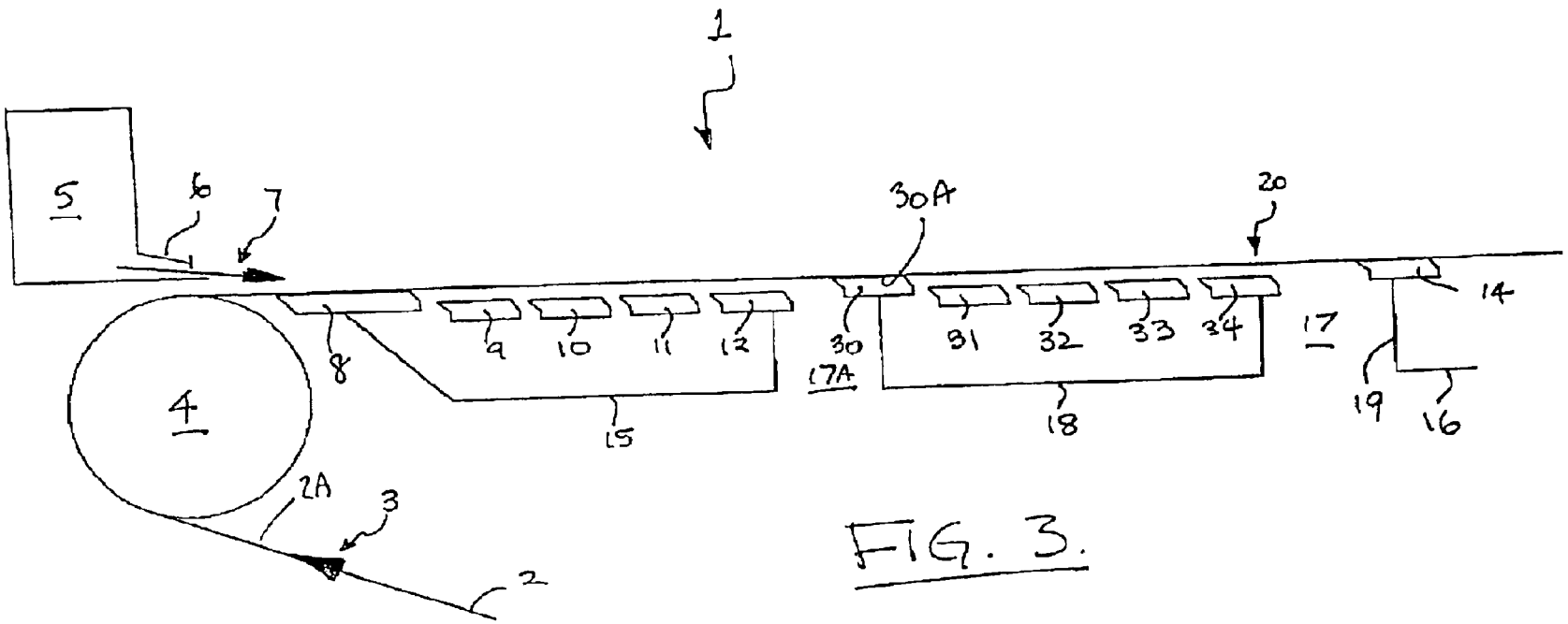
FIG. 3 shows a first alternative general arrangement to that shown in FIG. 1.

In FIG. 3, two changes are made in comparison with FIG. 1.

First, the foraminous surface is supported by two drainage boxes. The first part of the foraminous surface, represented by the support elements 9-12 inclusive, is supported by the drainage box 15, and the second part, represented by the support elements 30-34, is supported by the drainage box 18. The three drainage boxes 15, 18 and 16 in sequence are separated by the gaps 17 and 17A. The first fixed element 8 is supported by the drainage box 15, and the last fixed element 14 is supported by the drainage box 16. As shown, the support elements 9-12 and 31-34 are adjusted to be out of the reference plane 20, and thus out of contact with the surface 2A of the forming fabric 2. Support element 30 is shown adjusted to be in the reference plane and thus in contact with the machine side surface 2A of the forming fabric 2. Although support element 30 can be an adjustable element, it is preferred that support element 30 is fixed, with its surface 30A set in the reference plane defined by the preceding first fixed element 8 and the following last fixed element 14.

Second, the number of support elements in the foraminous support surface between the first and last fixed support elements is higher, there being 4 in FIGS. 1, and 9 in FIG. 3. It can thus be seen that there is considerable flexibility in choosing how many support elements are to comprise the foraminous surface. In use, the position to which each of the support elements 9-12 and 30-34 are adjusted will locate each of them either in contact, or out of contact, with the machine side surface 2A of the forming fabric 2, and will be chosen so as to provide a scale and intensity of activity in the stock carried by the paper side 2B of the forming fabric 2 which results in a sheet product with acceptable properties.

Figure 4:
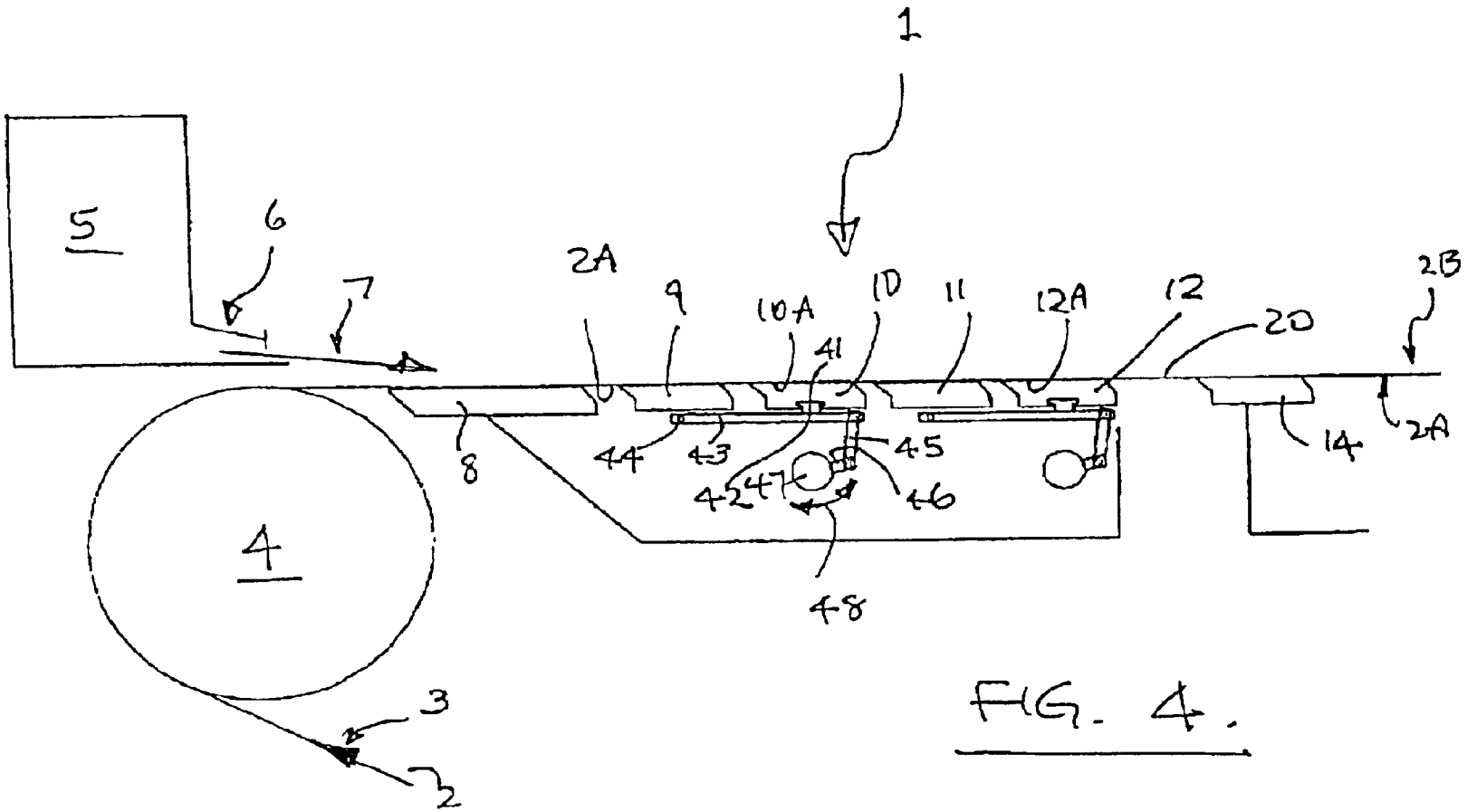
FIG. 4 shows an element adjusting means.

In FIG. 4 one presently preferred mechanism for locating the adjustable elements is shown, as part of an alternative arrangement to that shown in FIGS. 1 and 2. As shown in FIG. 3, two elements, 9 and 11 are fixed and cannot be adjusted, and two elements, 10 and 12, can be adjusted to locate their fabric support surfaces 10A and 12A each separately in or out of contact with the forming fabric. The mounting for element 10 is exemplary.

The support element 10 includes a suitably shaped slot 41 which is a sliding fit onto a standard T-bar 42. The T-bar is carried by an arm 43 which is pivotally mounted at one end, as at 44. The framing required to support the pivot 44 is not shown; in practice, several mounting units will normally be required for each adjustable element spread out across the width of the forming section framing. At the other end of the pivotal mount, the arm 43 is attached to one end of a link 45; the other end of the link 45 is attached to a lever arm 46 carried by a shaft 47. The position of the element 10 is adjusted by rotation of the shaft 47. As indicated by the arrows 48 rotation of the shaft 47 will adjust the position of the contact surface 10A of the support element 10 to be in contact with the surface 2A of the forming fabric 2 substantially in the reference plane 20 (anticlockwise rotation as shown) or will adjust the position of the contact surface 10A of the support element 10 to be out of contact with the surface 2A of the forming fabric 2 (clockwise rotation as shown). In practice, it should be noted that the range of adjstment required for a support element from being out of contact with the forming fabric machine side surface 2A to being in contact with that surface 2A in the region of the reference plane is quite small: the distance between being just out of contact and in full contact with the wet surface 2A of the forming fabric 2 is of the order of about 2.0 mm. The mounting should be configured so that the support element can be adjusted so that there is free space between the support element surface and the surface 2A of the forming fabric.

Figure 5:
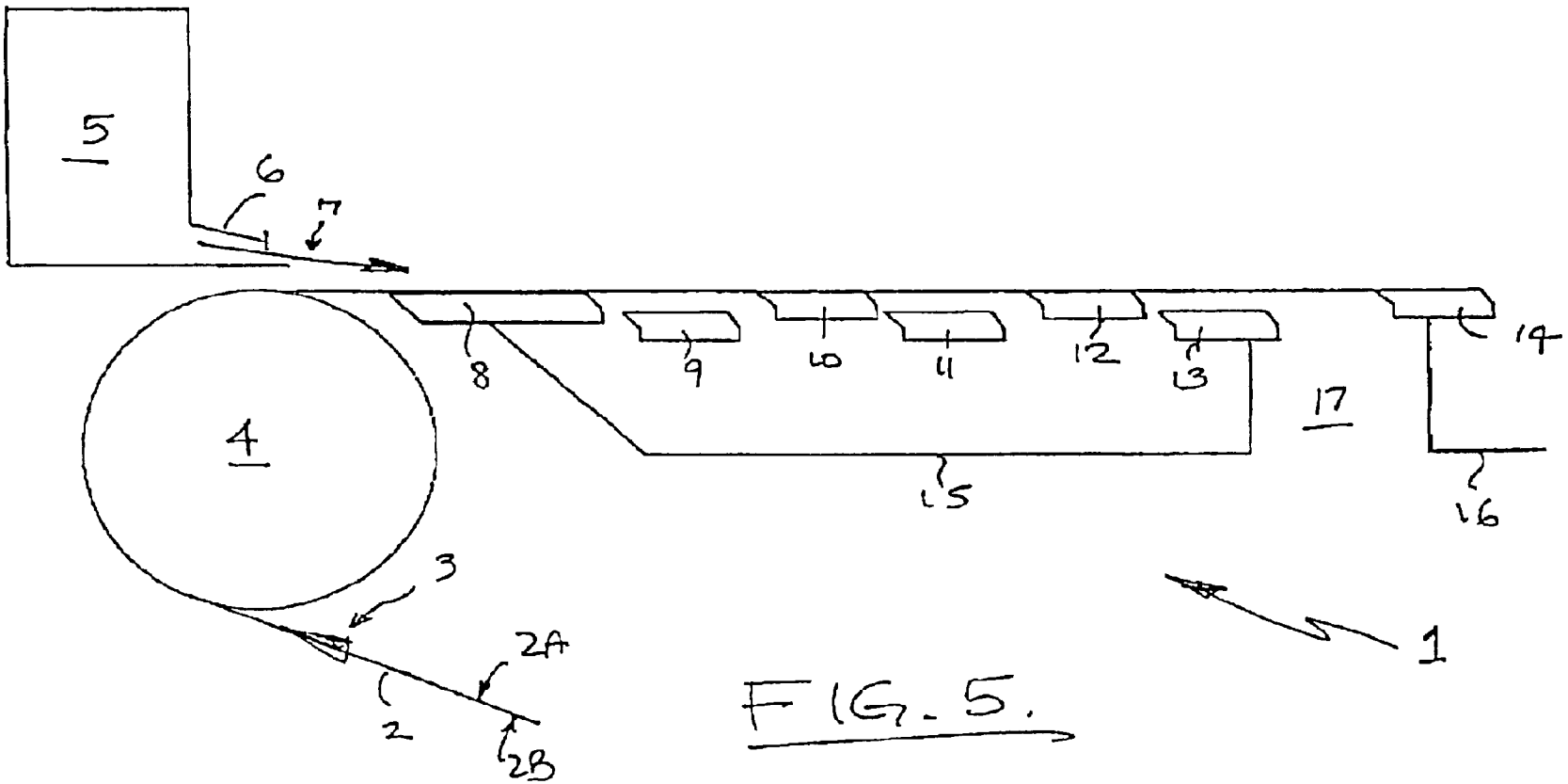
FIG. 5 shows a second alternative arrangement to that shown in FIGS. 1 and 2.

In each of FIGS. 1, 2 and 4 there is an even number of support elements between the first and last fixed elements. If an odd number of elements is used, further combinations become possible. As is shown in FIG. 5, it is then possible to alternate the raised and lowered elements so that the sequence is symmetrical. In FIG. 5 the first element 8, and the last element 14 are still fixed in place. In between them are five support elements 9-13. As shown, only elements 10 and 12 are in contact with the surface 2A of the forming fabric 2, and elements 9, 11 and 13 are out of contact with surface 2A. Other arrangements are possible if all of the support elements are adjustably mounted. It is also possible to use fixed mountings for one, or more, of such a set of elements.

A further variation can be seen from FIG. 5. As shown in FIG. 5 there is a gap 17 between the first drainage box 15 and the next one 16. This gap can be eliminated so that, for example, the support element 14 is located above a common wall, or above two abutting walls, separating the drainage boxes 15 and 16.

In each of these arrangements, the amount of agitation, in terms of its scale and intensity, generated in the stock by the combination of the fixed first and last support elements with the at least one adjustable element in the foraminous support surface depends essentially on two factors. These are:

(i) which elements are chosen to be in contact with the forming fabric, and (ii) the profile chosen for the forming fabric contacting surfaces of each of those elements.

For any given working papermaking machine, it is thus apparent that some experimentation will often be required to obtain the ideal combination of available elements in contact with, or out of contact with the forming fabric tp provide the desired scale and intensity of agitation within the stock.

There are several options which become available in the practise of this invention.

First, in the forming section the profile of the supporting surfaces of the elements are all the same. In this case, the adjustment is used essentially to alter the machine direction spacing of the elements.

Second, all of the elements do not have the same fabric supporting surface profile. In this case, the paper maker has more flexibility of control over the level of turbulence induced in the stock.

Third, essentially independently of the fixed elements, in the forming section the profile of the supporting surfaces of the vertically adjustable elements are all the same. If the profile chosen for the adjustable elements is not the same as that chosen for the fixed ones then again more flexibility is obtained.

Fourth, essentially independently of the fixed elements, in the forming section the profile of the supporting surfaces of the vertically adjustable elements are not all the same. This option introduces a higher level of flexibility.

It is also contemplated that these options can be combined together. Additionally, since it is possible to change the fabric contacting surface of an element, which option is in use can be changed without stopping the papermaking machine forming section.

It should also be noted that whether or not the desired scale and intensity of agitation within the stock has been achieved can only be properly determined from the properties of the sheet product being made on the paper making machine. Hence in order to determine whether further adjustment is required it is desirable to allow sufficient time for stable operating conditions to be re-established in the paper making machine and then to assess the sheet properties. This assessment can be made by on-line monitoring devices, which will provide the most rapid response. Such devices also offer the possibility of on-line automated control. Alternatively, assessment will involve retrieving and examining a sample of the sheet product being made in the machine. These steps can take from several minutes to up to about an hour before the required information is obtained.

Since there is always the possibility to alter the selection of which support elements are adjusted to be in contact with the machine side surface of the forming fabric, which may not all have the same fabric supporting surface profile, it becomes far easier to reconfigure the initial impingement zone of the papermaking machine to accommodate a change in product being made.

In the preceding description, an open surface forming section is described. This invention is not so limited, and is applicable to other known forms of papermaking machines. Thus this invention can be applied to any one of the following group of papermaking machines:

- an open surface forming section of a papermaking machine having a single forming fabric;
- a hybrid gap former papermaking machine having two superposed forming fabrics in which at least that portion of the forming section adjacent the head box slice has one forming fabric having an open surface; and
- a twin fabric papermaking machine having two forming fabrics each having a paper side and a machine side, in which the jet of stock is delivered into the gap between the paper sides of the two fabrics. For each type of machine, at least one adjustable support element should be located in or near to the impingement zone adjacent the head box slice.

In the first two types, the reference surface defined by the fixed first and last blades is essentially a horizontal plane. In a twin fabric machine, the forming section adjacent to the head box slice includes a forming shoe, which may be curved or flat, and which carries support elements in contact with the machine side of a first forming fabric. In the practice of this invention, at least one of the support elements carried by the forming shoe will be adjustable into and out of contact with the machine side of the first forming fabric. Further, when a curved forming shoe is used, the reference surface defined by the machine side of the first forming fabric and the positions of the fixed support elements may not be a single plane, but instead will follow the contour of the forming shoe.

What is claimed is:

1. An apparatus for improving sheet properties in a paper making machine including [a] *an open surface* forming section, [at least one] *having a single* forming fabric, *the fabric* having a machine side and a paper side[.] *and* moving in the machine direction, and a head box having *a* head box slice which delivers a stock jet onto the paper side of the [at least one] moving forming fabric, comprising in sequence in the machine direction:

*a*) a first fixed support element and in contact with the machine side of the [at least one] forming fabric;

*b*) at least one drainage box provided with a foraminous support [surface] *surfaces, said foraminous support surface includes at least one vertically adjustable support element* and [which] is provided with support means for the first fixed element;

*c*) a last fixed support element, supported by a drainage box, in contact with the machine side of the [at least one] forming fabric, which together with the first fixed support element and the machine side of the [at least one] forming fabric defines a reference surface; [and]

*d*) the at least one drainage box having an independently controlled vertical adjustment means for *the* at least one vertically adjustable support element, which permits adjustment of the or each vertically adjustable element while the paper making machine is operating so as to move said at least one vertically adjustable support element into and out [off] *of* contact with the machine side of the forming fabric.

2. An apparatus according to claim 1, wherein the first fixed *support* element is adjacent to the head box slice.

3. An apparatus according to claim 1 wherein the foraminous surface is supported by a plurality of drainage boxes in sequence.

4. An apparatus according to claim 2 wherein the foraminous surface is supported by a plurality of drainage boxes in sequence.

5. An apparatus according to claim [1] *3*, wherein a first support [and last support elements] *element* in the machine direction in a first drainage box [are] *is* fixed, and both a first support and last support elements for a second drainage box immediately following in the machine direction are fixed.

6. An apparatus according to claim 1, wherein a first support [and last support elements] *element* in the machine direction in a first drainage box [are] *is* fixed, and both a first support and last support elements for a second drainage box immediately following in the machine direction are *not* fixed.

[7. An apparatus according to claim 1 wherein the papermaking machine including the forming section is chosen from the group consisting of:

- an open surface paper making machine having a single forming fabric;
- a hybrid gap former paper making machine having two superposed forming fabrics in which at least that portion of the forming section adjacent the head box slice has one forming fabric having an open surface; and a twin fabric papermaking machine having two forming fabrics each having a paper side and a machine side, in which the jet of stock is delivered onto the paper side of at least one of the two fabrics, and at least a plurality of support elements in contact with the machine side of at least one of the forming fabrics are adjustable.]

8. An apparatus according to claim [1] *3*, including at least [two] *three* drainage boxes wherein a first support [and last support elements] *element* in the machine direction in a first *one of the* drainage [box are] *boxes is* fixed and [both] a [first support and last] support [elements] *element* for a [second] *third one of the* drainage [box immediately] *boxes* following in the machine direction [are] *is* fixed *and all of the support elements for a second one of the drainage boxes are not fixed.*

*9. An apparatus according to claim 1, wherein the at least one drainage box which is provided with the foraminous support surface that includes the at least one vertically adjustable support element is provided with support means for the first fixed support element and the last fixed support element.*

*10. An apparatus according to claim 3, wherein there are at least two of the drainage boxes wherein a first support element in the machine direction in a first one of the drainage boxes is fixed and a first support element for a second one of the drainage boxes immediately following the first drainage box in the machine direction is fixed.*

*11. An apparatus according to claim 3, wherein at least three of the drainage boxes are provided, wherein a first support element in the machine direction in a first one of the drainage boxes is fixed, a first support element in the machine direction in a second one of the drainage boxes is fixed, and a support element for a third one of the drainage box following in the machine direction is fixed and all of the remaining support elements of the first and second drainage boxes are not fixed.*

*12. An apparatus according to claim 1, wherein the independently controlled vertical adjustment means for the at least one vertically adjustable support element which permits adjustment of the or each vertically adjustable element includes a pivoting arm having a first end connected to a pivot point and a second end connected to a link that is movable by rotation of a shaft, and a plurality of the pivoting arms are located under the or each vertically adjustable element.*

*13. An apparatus according to claim 1, wherein profiles of supporting surfaces of the or each adjustable support element and the fixed support elements are the same.*

*14. An apparatus according to claim 1, wherein profiles of supporting surfaces of the or each adjustable support element and the fixed support elements are not all the same.*

* * * * *

UNITED STATES PATENT AND TRADEMARK OFFICE

CERTIFICATE OF CORRECTION

PATENT NO. : RE43,679 E
APPLICATION NO. : 13/184689
DATED : September 25, 2012
INVENTOR(S) : Van Essen et al.

It is certified that error appears in the above-identified patent and that said Letters Patent is hereby corrected as shown below:

IN THE CLAIMS

Column 10, Claim 1, line 23, delete “element and” and insert therefore --element--.

Signed and Sealed this
Fourth Day of December, 2012

David J. Kappos
*Director of the United States Patent and Trademark Office*